United States Patent Office 3,657,235
Patented Apr. 18, 1972

3,657,235
HEXAHYDRO-1,3,5-TRISUBSTITUTED-s-
TRIAZINES CONTAINING FLUORINE
Bernard M. Lichstein, Elizabeth, and Robert J. Du Bois,
Morristown, N.J., assignors to Allied Chemical Corporation, New York, N.Y.
No Drawing. Filed Oct. 17, 1969, Ser. No. 867,370
Int. Cl. C07d 55/14
U.S. Cl. 260—248 NS                    10 Claims

ABSTRACT OF THE DISCLOSURE

Novel compounds useful in imparting oil repellency to fabrics have the formula

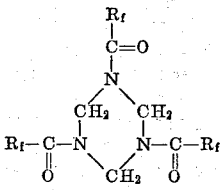

wherein $R_f$ is a radical containing at least one fluorine atom and from 1 to 20 carbon atoms, the radical being selected from the group consisting of alkyl, phenyl, alkylphenyl, phenylalkyl, and any of these radicals containing an ether linkage. The compounds are prepared by reacting a nitrile of the formula $R_fCN$ with formaldehyde, preferably as trioxane, in the presence of a catalytic amount of a strong acid and preferably also in the presence of a solvent such as carbon tetrachloride.

BACKGROUND OF THE INVENTION

This invention relates to hexahydro-1,3,5-trisubstituted-s-triazines containing fluorine.

It is desirable to impart soil and stain repellency to fabrics used in apparel, upholstery, draperies and similar applications. A current method used to impart soil and stain repellency to fabrics involves coating the fabric with an oil repellent compound. The coating is normally applied using common textile finishing techniques, such as by treating the fabric with a padding bath of a solution or aqueous dispersion of the compound or by spraying the surface of the fabric with the compound.

In order to be suitable in such coating applications, a compound must possess certain critical properties in addition to oil repellency; for example, the compound must be capable of forming a uniform and even coating of proper thickness on the fabric and the coating must adhere well to the fabric and must not be easily removed by physical or chemical means. Other critical properties which the compound must possess are appreciated by those skilled in the art, but the suitability of a particular class of compounds in such applications can only be determined by empirical methods.

It is an object of this invention to provide a class of novel compounds useful for imparting oil repellency to fabrics and other textile materials.

SUMMARY OF THE INVENTION

This invention provides compounds capable of imparting oil repellency to fabrics, said compounds having the formula

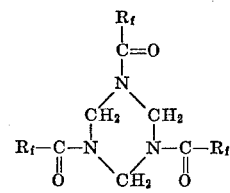

wherein $R_f$ is a radical containing at least one fluorine atom and from 1 to 20 carbon atoms, the radical being selected from the group consisting of alkyl, phenyl, alkylphenyl, phenylalkyl, and any of these radicals containing an ether linkage. The radical can be perfluorinated or can contain any lesser number of fluorine atoms down to at least one. As used herein, the term "alkyl radical" includes both straight and branched chain radicals.

The compounds of this invention are prepared by reacting a nitrile of the formula $R_fCN$, wherein $R_f$ has the meaning given above, with formaldehyde in the presence of a catalytic amount of a strong acid.

The formaldehyde can be present in its monomeric form or in the form of a cyclic polymer, such as trioxane, or in the form of a linear polymer, such as paraformaldehyde. Trioxane is the preferred reactant.

Suitable catalysts include sulfuric acid, hydrochloric acid, phosphoric acid, zinc chloride, ferric chloride, stannic chloride, and strongly acidic resins, such as Amberlyst 15, which is a cross-linked resin containing pendent —$SO_3^-H^+$ groups. The catalyst is preferably present in an amount of about 1% by weight based on the total weight of the reactants. Greater or lesser amounts of catalyst can be used if desired, but it is preferable not to use more than the minimum amount required to maintain a moderate rate of reaction. An excess of catalyst contributes to undesirable hydrolysis of the nitrile.

The reaction is preferably carried out in the presence of an inert solvent, such as chloroform or carbon tetrachloride.

The temperature of the reaction is not especially critical and can range from 0° C. up to the reflux temperature of the solvent.

There is also obtained as a byproduct of the reaction a methylene bisamide having the formula

$$(R_fCONH)_2CH_2$$

wherein $R_f$ is the same as in the hexahydro-s-triazine product. These bisamides are also novel compounds and are claimed in copending application Ser. No. 867,372, filed concurrently herewith.

The best mode contemplated for preparing the compounds of this invention is to react the appropriate nitrile with trioxane in the presence of about 1% by weight of concentrated sulfuric acid as catalyst, and also in the presence of carbon tetrachloride as solvent, the reaction being carried out under reflux for a period of from one to two hours.

The compounds of this invention can be applied to fabrics to render them oil repellent by dissolving the compound in a suitable solvent, such as acetone, and then treating the fabric with the compound in solution, followed by removal of the solvent by evaporation. In some instances it is desirable to heat the treated fabric at moderately elevated temperatures, such as from about 120 to 160° C., for a brief period, such as about 5 minutes, in order to set the coating of the compound on the fabric. Fabrics thus treated exhibit greater oil repellency than untreated fabric. In comparison, fabrics treated with the nonfluorine-containing analogs of the compounds of this invention exhibit no improvement in oil repellency over untreated fabric.

DESCRIPTION OF THE PREFERRED EMBODIMENTS

In the preferred compounds of this invention, the $R_f$ moiety contains a terminal perfluoroalkyl group. For example, compounds wherein $R_f$ is a phenyl group having one or two perfluoro(lower alkyl) substituents give particularly good results.

The more preferred compounds of this invention have the formula

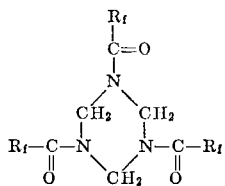

wherein $R_f$ has the formula $$Y(CF_2)_m(CH_2)_n—$$

wherein $m$ is an integer from 2 to 10, $n$ is an integer not greater than $m$ from 0 to 4, and Y is selected from the group consisting of $F_3C—$ and radicals having the formula

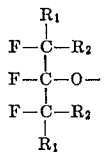

wherein $R_1$ and $R_2$ are independently fluorine or perfluoroalkyl groups having from one to two carbon atoms, the total number of carbon atoms being not more than 20. In especially preferred embodiments of this invention, $R_1$ and $R_2$ are fluorine, $m$ is 2 to 5, and $n$ is 0 to 2.

Nitrile reactants having the formula $$CF_3(CF_2)_m(CH_2)_nCN$$

are known compounds and can be made from commercially available materials in accordance with known methods. Nitrile reactants having the formula

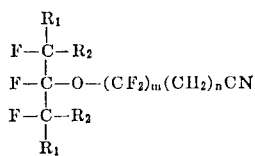

can be prepared from telomer halides having the formula

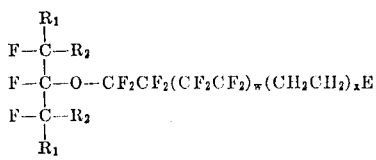

wherein $R_1$ and $R_2$ have the afore-stated meanings, $w$ and $x$ are integers representing the respective degrees of telomerization, and E is bromine or iodine. These telomer halides and their method of preparation are described in U.S. Pat. 3,514,487. The telomer halides are prepared by reacting telogens of the formula

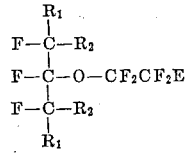

with telomerizable unsaturated compounds, i.e., tetrafluoroethylene and ethylene, the reaction being initiated by heat or free radical catalyst. The telogens are prepared by reacting the corresponding perfluorinated ketone with an ionizable fluoride salt, e.g. CsF, to form the corresponding organic salt, and then reacting the organic salt with tetrafluoroethylene and either bromine or iodine. Preparation of the telogens is described in greater detail in U.S. Pat. 3,453,333.

Nitrile reactants wherein $n$ is a zero can be prepared by reacting the corresponding telomer halide with ICN or $(CN)_2$ at pressures above 20 atmospheres and at temperatures above 300° C. Nitrile reactants wherein $n$ is greater than zero can be prepared by reacting the corresponding telomer halide with an alkali metal cyanide in the presence of dimethyl sulfoxide at temperatures between 60 and 100° C. The nitriles and their method of preparation are described in greater detail in Canadian Patents 823,673 and 823,674, corresponding to U.S. applications Ser. Nos. 721,115 and 721,117, respectively, both U.S. applications having been filed on Apr. 12, 1968.

The nitriles normally contain an even number of hydrocarbyl and fluorocarbyl groups following the perfluoroalkoxy group. However, nitriles containing an odd number of either group or both groups can be prepared by reacting the telomer halide with sulfur trioxide, followed by hydrolysis of the reaction product to obtain the acid, from which the nitrile can be prepared in accordance with known methods. Also, the acid thus formed can be converted to the corresponding telomer iodide for further telomerization by reaction with alkali-free silver oxide to form the silver salt, followed by reaction of the silver salt with powdered iodine to form the telomer iodide.

In addition to giving preferred results when applied to fabrics as conventional oil repellent agents, the more preferred compounds of this invention have the additional utility of being capable of imparting oil repellency directly to fibers extruded from a composition of a fiber-forming synthetic resin and about 1% by weight of the compound. This particular use of the more preferred compounds of this invention is the invention of two of our coworkers and is disclosed in copending U.S. application S.N. 867,368, filed concurrently herewith.

The following examples further illustrate the invention. In each of the examples the product was identified by elemental, infrared spectrum, and nuclear magnetic resonance analyses.

Example 1

A mixture of 15 grams of 5 - perfluoroisopropoxy-5,5,4,4-tetrafluorovaleronitrile, 25 ml. of $CCl_4$, and 0.2 gram of concentrated $H_2SO_4$ were brought to reflux. A solution of 1.34 grams of trioxane in 45 ml. of $CCl_4$ was added over a period of one hour. The mixture was maintained at reflux for an additional 75 minutes. On cooling, the mixture separated into two layers. Each layer was dissolved in ether, washed with dilute NaOH and then water, dried over $MgSO_4$, and then stripped of solvent under vacuum. There was thus obtained from the top layer 7.2 grams of a waxy solid, 97% pure by gas chromatographic analysis, which was identified as the hexahydro-s-triazine having the formula

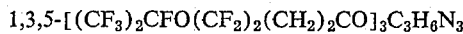

Example 2

The general procedure of Example 1 was followed except the reaction mixture contained 65.0 grams of 7 - perfluoroisopropoxy - 7,7,6,6,5,5,4,4 - octafluoroheptanonitrile, 4.6 grams of trioxane, 0.7 gram of concentrated $H_2SO_4$, and 150 ml. of $CCl_4$. Upon completion of the reaction, the mixture was dissolved in chloroform, washed with dilute sodium carbonate, dried over magnesium sulfate, and stripped of solvent under vacuum. The product was recovered by recrystallization from $CCl_4$. There was thus recovered 61.0 grams of dried crystals, melting point 81–83° C., which were identified as the hexahydro-s-triazine having the formula $$1,3,5\text{-}[(CF_3)_2CFO(CF_2)_4(CH_2)_2CO]_3C_3H_6N_3$$

Example 3

A mixture of 5.1 grams of m-trifluoromethylbenzonitrile, 0.2 gram concentrated $H_2SO_4$, and 20 ml. of $CCl_4$ was heated to 70° C. A solution of 0.95 gram of trioxane in 30 ml. of $CCl_4$ was added over a period of 2 hours. The mixture was heated at 77° C. for an additional 90 minutes. The cooled reaction mixture was dissolved in chloroform, washed with dilute sodium carbonate solution and then water, dried using molecular sieves, and stripped of solvent under vacuum. The product, recovered by recrystallization from $CHCl_3$—$CCl_4$, was a white solid, melting point 153–153.5° C., and was identified as the hexahydro-s-triazine having the formula $$1,3,5\text{-}(m\text{-}CF_3C_6H_4CO)_3C_3H_6N_3$$

Example 4

The general procedure of Example 3 was followed except the reaction mixture contained 5.1 grams of o-trifluoromethylbenzonitrile, 0.95 gram of trioxane, 0.2 gram of concentrated $H_2SO_4$, and 50 ml. of $CCl_4$. The product, recovered by recrystallization from ether-hexane, was identified as the hexahydro-s-triazine having the formula $1,3,5\text{-}(o\text{-}CF_3C_6H_4CO)_3C_3H_6N_3$.

Example 5

The general procedure of Example 3 was followed except the reaction mixture contained 6.1 grams of 3,5-bis(trifluoromethyl)benzonitrile, 0.84 gram of trioxane, 0.1 gram of concentrated $H_2SO_4$, and 45 ml. of $CCl_4$. 5.1 grams of product were recovered by recrystallization from $CCl_4$—$CHCl_3$. The product was a white solid, melting point 221° C., and was identified as the hexahydro-s-triazine having the formula $$1,3,5\text{-}[3',5'\text{-}(CF_3)_2C_6H_3CO]_3C_3H_6N_3$$

Example 6

The general procedure of Example 3 was followed except the reaction mixture contained 9.1 grams of p-fluorobenzonitrile, 0.4 gram trioxane, 0.4 gram concentrated $H_2SO_4$, and 95 ml. of $CCl_4$. 5.4 grams of product were obtained by recrystallization from $CCl_4$—$CHCl_3$. The product was a white solid, melting point 182.0–182.5° C., and was identified as the hexahydro-s-triazine having the formula $1,3,5\text{-}(p\text{-}FC_6H_4CO)_3C_3H_6N_3$.

Example 7

The general procedure of Example 3 was followed except the reaction mixture contained 5.1 grams of perfluorobenzonitrile, 0.8 gram of trioxane, 0.1 gram of concentrated $H_2SO_4$, and 50 ml. of $CCl_4$. 2.54 grams of product were recovered by recrystallization from $CCl_4$. The product was a white solid, melting point 146–148° C., and was identified as the hexahydro-s-triazine having the formula $1,3,5\text{-}(C_6F_5CO)_3C_3H_6N_3$.

DEMONSTRATION OF OIL REPELLENCY

The following compounds were tested for their ability to impart oil repellency to cotton cloth: 1,3,5-tris(7-perfluoroisopropoxy - 7,7,6,6,5,5,4,4 - octafluoroheptanoyl) hexahydro-s-triazine (Example 2), 1,3,5 - tris(5 - perfluoroisopropoxy - 5,5,4,4 - tetrafluorovaleryl) hexahydro-s-triazine (Example 1), 1,3,5 - tris(m-trifluoromethylbenzoyl)hexahydro-s-triazine (Example 3), 1,3,5-tris(p-fluorobenzoyl)hexahydro-s-triazine (Example 6).

The compounds were applied as a 2% solution in acetone on untreated cloth. The solvent was removed by heating at 50–73° C. for 24 hours.

The oil repellency of the cloth samples was determined by the procedure described on pages 323–4 of the April, 1962 edition of the Textile Research Journal. This procedure involves gently placing on the treated fabric drops of mixtures of mineral oil and n-heptane in varying proportions. The drops are allowed to stand on the treated fabric undisturbed for 3 minutes. After the 3 minute period, the wetting and penetration of the fabric is observed visually. The number corresponding to the mixture containing the highest percentage of n-heptane which does not penetrate or wet the fabric is the oil-repellency rating of the treated fabric.

The samples were tested for oil repellency both before and after they were heat treated at 150° C. for 5 minutes. The results are tabulated below.

| Compound | Oil repellency rating | |
|---|---|---|
| | Before heat treatment | After heat treatment |
| Example: | | |
| 2 | 100 | 100 |
| 1 | 80 | 80 |
| 3 | 70 | 70 |
| 6 | 0 | 0–50 |

We claim:
1. A compound of the formula

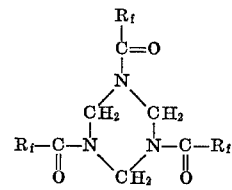

wherein $R_f$ is a fluorinated hydrocarbon radical selected from the group consisting of alkyl, alkoxyalkyl, phenyl, alkylphenyl, and phenylalkyl, the radical having from 1 to 20 carbon atoms and containing at least one fluorine atom as a substituent.

2. The compound of claim 1 wherein the $R_f$ radical contains a terminal perfluoroalkyl group.

3. The compound of claim 2 wherein $R_f$ is a phenyl radical having one or two perfluoro(lower alkyl) substituents.

4. The compound of claim 1 wherein the radical is perfluorinated.

5. The compound of claim 1 wherein the radical is selected from the group consisting of alkyl, phenyl, alkylphenyl, and phenylalkyl, the radical having from 1 to 20 carbon atoms and containing at least one fluorine atom as a substituent.

6. The compound of claim 5 wherein the radical contains a terminal perfluoroalkyl group.

7. The compound of claim 6 wherein $R_f$ is a phenyl radical having one or two perfluoro(lower alkyl) substituents.

8. The compound of claim 5 wherein the radical is perfluorinated.

9. A compound of the formula

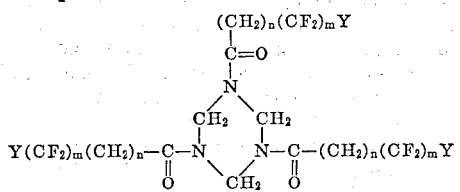

wherein $m$ is an integer from 2 to 10, $n$ is an integer not greater than $m$ from 0 to 4, and Y is selected from the group consisting of $F_3C-$ and radicals having the formula

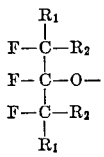

wherein $R_1$ and $R_2$ are independently fluorine or perfluoroalkyl groups having from one to two carbon atoms.

10. The compound of claim 9 wherein $m$ is 2 to 5, $n$ is 0 to 2, and Y is a radical having the formula $(CF_3)_2CFO-$

References Cited

UNITED STATES PATENTS

| | | | |
|---|---|---|---|
| 2,559,835 | 7/1951 | Zerner et al. | 260—248 |
| 2,568,620 | 9/1951 | Gresham et al. | 260—248 |
| 2,615,882 | 10/1952 | Zerner et al. | 260—248 |

JOHN M. FORD, Primary Examiner

U.S. Cl. X.R.

117—143 R; 252—8.8